Figure 1:
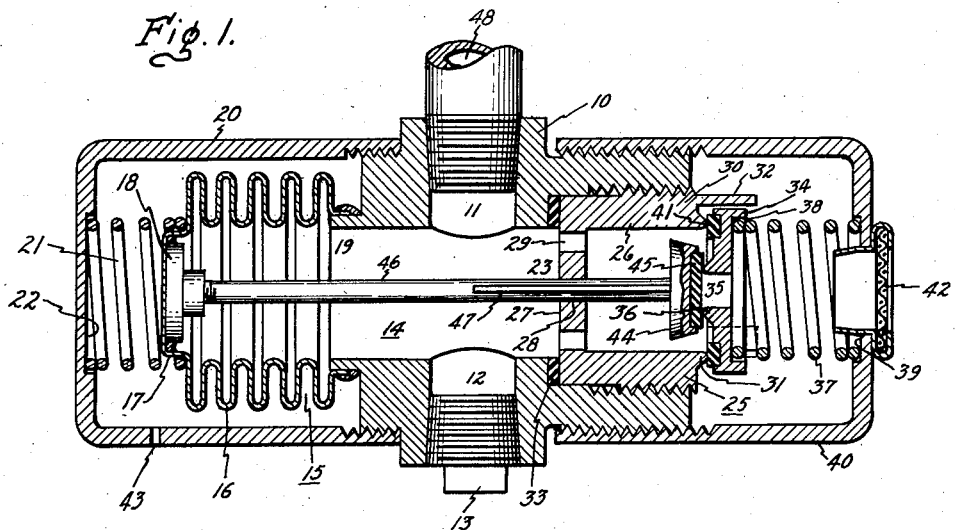

July 22, 1958

F. MORSE 2,844,165

PRESSURE VACUUM RELIEF VALVE

Filed Nov. 29, 1954

Inventor
Francis Morse,
by Gilbert P. Tarleton
His Attorney.

United States Patent Office 2,844,165
Patented July 22, 1958

2,844,165

PRESSURE VACUUM RELIEF VALVE

Francis Morse, Pittsfield, Mass., assignor to General Electric Company, a corporation of New York Application November 29, 1954, Serial No. 471,858

7 Claims. (Cl. 137—493.6)

This invention relates to pressure regulators, and more particularly to a pressure-vacuum relief valve for fluid pressure control.

In the past many devices have been designed for the combined purpose of releasing gas from a sealed vessel when the gas has attained a predetermined positive pressure, and admitting gas to the vessel when the gas in the vessel has attained less than a predetermined negative pressure. Such devices generally employ two opposed spring loaded valve disks which relieve excess pressure or vacuum when the force produced by either over the disk areas reaches a certain predetermined value.

This arrangement produces several disadvantages in the operation of the valves. Since the disk areas of such valves are relatively small, the acting forces are not capable of readily distinguishing between small differentials of pressure. As a result the valves open and close gradually over a wide range of pressures, and the discharge rate of gases through the valves is very low when the acting forces are due to pressures only slightly above the setting values. Thus these valves are slow in relieving the vessel pressures unless a large pressure differential is present. Although in some instances this deficiency is allowable, when it is absolutely necessary to maintain the pressure within a certain definite range (such as in the case of sealed power transformers), it is desirable to relieve the excessive pressure or vacuum in the shortest possible time. Damage to equipment may result from the use of a valve that acts too slow. Furthermore, when relatively low pressure or vacuum is required within a vessel, it is highly undesirable for the pressure or vacuum to build up to the point where full discharge from the valve is permitted. If restraining forces within the valve are relieved to allow faster action on small differentials of gas pressure when relatively low pressures or vacuums are involved, the valves tend to flutter. These difficulties may be overcome by substantially increasing the area of the valve surfaces, but such a method is usually impractical in view of the space required for a valve having greater proportions and the additional cost involved in such an increase.

This invention has overcome these difficulties by employing a metallic bellows to actuate the opposed spring loaded valve disks, thereby not limiting the action of the valve to forces incident upon the the areas of the valve disks. A mechanical linkage is provided between the disks and the bellows, with the result that, due to the greater flexibility and larger effective area of the bellows, there is a more definite point of discharge, and an absence of flutter near the setting points.

It is, therefore, an object of this invention to provide an improved pressure-vacuum valve for gas pressure control.

Another object is to employ metallic bellows in pressure-vacuum valves in order to increase the sensitivity of such valves to small pressure differentials.

Still another object of this invention is to reduce the tendency of pressure-vacuum valves to flutter by employing a metallic bellows arrangement to control the valve disks.

A further object is to provide a pressure-vacuum valve having increased discharge rates at pressures or vacuums slightly above the setting value by employing a metallic bellows as the sensitive area and thereby not relying upon the area of the valve disks.

My invention will be better understood from the following description taken in connection with the accompanying drawing and its scope will be pointed out in the appended claims.

Figure 2:
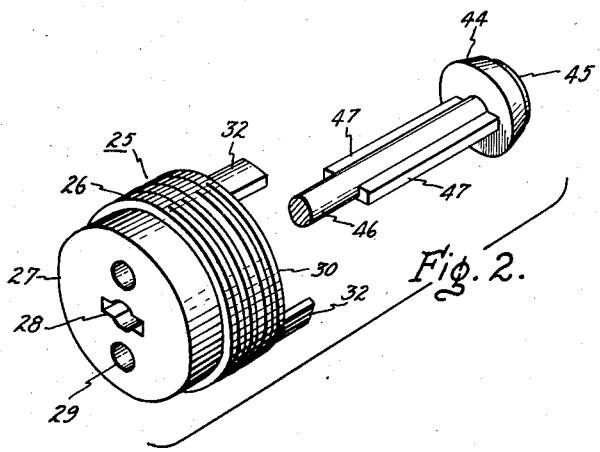

In the drawing:

Fig. 1 is a cross sectional view of a typical pressure-vacuum valve embodying the principles of this invention, and Fig. 2 is a perspective view illustrating the manner of guiding the valve rod through the guide sleeve of the pressure-vacuum valve of Fig. 1.

Referring now to Fig. 1, a valve body 10 machined from a metal such as brass is provided with threaded inlet port 11, and threaded drain port 12 into which is inserted a threaded drain plug or sampling valve 13. A bore 14 extends through the valve body 10 on an axis approximately normal to the axis of the inlet and drain ports.

Over one end 19 of the bore 14 and brazed or soldered to the body is an extended metallic bellows 15. The bellows 15 has an expandable portion 16 adjacent the body 10, and an end section 17 covering the end thereof which serves the dual purpose of enclosing the bellows and providing a seat for a weld nut 18. Thus the metallic bellows 15 provides an air tight seal over the end 19 of bore 14. A threaded cover 20 is threaded onto the body 10 over the bellows to provide protection for the bellows, and also to provide an adjustment for the valve as will be described later. A coil spring 21 is inserted in compression between the end 17 of the bellows and a depression 22 in the end of cover 20. A hole 43 may be provided in cover 20 to maintain atmospheric pressure on the outside of the bellows.

In the other end 23 of the bore 14 is inserted a threaded sleeve 25. The sleeve 25, which is also illustrated in Fig. 2, consists of a body portion 26 having external threads for holding the sleeve in the bore, an inlet end portion 27 having a central guide bore 28 and a plurality of gas ports 29 extending therethrough, and an outlet end portion 30. On the outlet end portion 30 is machined a first valve seat 31, and a plurality of projections 32 extend from this end and act as valve guides. A gasket 33 is provided between the inlet end portion 27 of the sleeve 25 and the valve body 10. If desired, the sleeve 25 and gasket 33 may be eliminated by combining the sleeve and body 10 into one piece.

A first valve disk 34 is provided with a central bore 35 having a second valve seat 36 on the side facing the body 10, and a ring shaped gasket 41 for providing a seal against valve seat 31. The first valve disk 34 is held in place against valve seat 31 by means of a compressed coil spring 37 inserted between a recess or shoulder 38 in the disk 34 and a recess 39 in threaded cover 40. The threaded cover 40 is screwed into place on valve body 10 and serves to protect the valve mechanism as well as to provide an adjustment to be discussed later. Fluids may enter or leave the device through any suitable opening in the cover 40 such as, for example, a hole in the end of cover having a gas filter 42 inserted therein.

A second valve disk 44 (seen also in Fig. 2) having a gasket 45 on one face is held in position against valve seat 36 by a valve rod 46, which extends through sleeve end 27, the other end of the valve rod being fastened to the weld nut 18. The valve rod may be provided with guide members 47 radially extending from its sides. The center bore 28 in sleeve end 27 is shaped to accept the rod 46 and guides 47, and acts to prevent rotation of the rod 46. These guides may be eliminated if desired, to prevent freezing up of the valve at low temperatures.

Any suitable means, such as a pipe or conduit 48 may be connected to inlet port 11 to provide means for introducing pressure to the valve.

In operation, when the internal pressure supplied to the valve through the inlet 48 is within the desired predetermined limits, valve disk 44 is held against its respective valve seat 36 by compressive action of the spring 21 and the valve disk 34 is held against its respective valve seat 31 by the compressive action of spring 37. Any pressure other than zero gauge, or atmospheric pressure, tends to upset the balance between the preloaded bellows and the helical springs, and when a critical pressure or vacuum is reached, a displacement occurs which opens the valve and permits the discharge or admission of gas. If this critical pressure is positive, the bellows expands, causing the valve rod 46 to lift the valve disk 44 from its seat and allowing gas to escape through the center bore 35 of valve disk 34 and out through the filter 42 in threaded cover 40, or through any other suitable opening in the cover. If the critical pressure is negative (a vacuum) the bellows contracts and the rod 46, acting against the action of spring 37, forces valve disk 34 from its seat 31 and allows air to enter the valve body by way of the filter or other opening as previously discussed.

The threaded covers 20 and 40 are provided not only to protect the mechanism from damage, but also to retain the two springs 21 and 37 respectively and to afford a means for calibrating the valve to the desired settings. By rotating the cover 20 at the bellows end of the valve, the pressure discharge setting may be varied, since this rotation regulates the compression of spring 21, and thereby determines the positive pressure at which expansion of the bellows permits opening of the discharge valve disk 44. By rotating threaded cover 40 at the other end of the valve, the vacuum relief setting may be varied, since this rotation regulates the compression of spring 37, and thereby determines the negative pressure at which contraction of the bellows overcomes the force of the spring 37 and permits opening of the vacuum relief valve disk 34. Thus, within the limits of the device, any desired combination of pressure and vacuum relief settings is possible.

The valve of this invention may be used in any application wherever gas or liquid pressures must be maintained at definite values between specified limits. By employing the metallic bellows as the pressure sensitive component in a combination vacuum and pressure valve, the valve of this invention provides greater sensitivity of operation, a closer calibration of setting, an increased discharge rate, and reduces the pressure differentials required to achieve these results.

It will be understood, of course, that, while the form of the invention herein shown and described constitutes the preferred embodiment of the invention, it is not intended herein to illustrate all of the possible equivalent forms or ramifications of the invention. It will be understood that the words used are words of description rather than of limitation, and that various changes, such as changes in shape, relative size, and arrangement of parts, may be substituted without departing from the spirit or scope of the invention herein disclosed.

What I claim as new and desire to secure by Letters Patent of the United States is:

1. A combined pressure-vacuum relief valve comprising a first spring means resiliently holding a first valve disk against a first valve seat, an aperture in said first valve disk, a second valve seat surrounding said aperture, a second spring means resiliently holding a second valve disk against said second valve seat, a metallic bellows having one end closed and the other end communicating with a source of fluid pressure to be controlled, and means cooperating with said bellows for opening one of said valves when the pressure within said bellows is less than a predetermined minimum pressure and for opening the other of said valves when the pressure within said bellows is above a predetermined maximum pressure.

2. A combined pressure-vacuum relief valve comprising a valve body having a chamber, an inlet port communicating with said chamber, a metallic bellows having one end closed and the other end communicating with said chamber, a first aperture in said chamber having a first valve seat, a first spring means resiliently holding a first valve disk against said first valve seat, a second aperture through said first valve disk, a second valve seat surrounding said second aperture, second spring means resiliently holding said second valve disk against said second valve seat, and linkage means connecting said bellows to said second valve disk and extending through said chamber for opening one of said valves when the pressure within said chamber is less than a predetermined minimum and for opening the other of said valves when the pressure within said chamber is above a predetermined maximum.

3. A combined pressure-vacuum relief valve comprising a valve body having a chamber, an inlet port communicating with said chamber, a metallic bellows having one end closed and the other end communicating with said chamber, an outlet port in said chamber having a first valve seat facing away from said chamber, a first valve disk resiliently held against said first valve seat by a first spring means, an aperture in said valve disk, a second valve seat surrounding said aperture and facing said chamber, a second valve disk resiliently held against said second valve seat by a second spring means, rod means extending through said chamber and connecting the closed end of said bellows with said second valve disk such that when the pressure in said bellows is less than a predetermined minimum the forces acting on said bellows overcome the force of said first spring means and open said first valve and when the pressure in said bellows is greater than a predetermined maximum the forces acting on said bellows overcome the force of said second spring means and open said second valve, and means for adjusting the forces exerted by said spring means.

4. A combined pressure-vacuum relief valve comprising a valve body having a chamber, an inlet port communicating with said chamber, a first and second threaded cover covering respectively a first and second port of said chamber, a metallic bellows located inside of said first cover and having one end closed and the other end connected in a fluid tight joint over said first port, a valve seat on the end of said second port and facing away from said chamber, a first valve disk held resiliently in place over said first valve seat by a first spring means in compression between said first valve disk and the inside of said second threaded cover, a first aperture in said first valve disk, a second valve seat surrounding said first aperture on said first valve disk and facing said chamber, a second valve disk resiliently held in place over said second valve seat by a rod means extending through said chamber and connecting the closed end of said bellows with said valve disk, and a second spring means in compression between the end of said bellows and the inside of said first cover, the compression of said spring means being adjusted by rotation of said threaded covers such that when pressure in said bellows is less than a predetermined minimum the forces acting on said bellows overcome the force of said first spring means and open said first valve and when the pressure in said bellows is greater than predetermined maximum the forces acting on said bellows overcome the force of said second spring means and open said second valve, and a second aperture to permit admission and discharge of fluids from within said second cover.

5. A combined pressure-vacuum relief valve comprising a valve body having a chamber, an inlet port communicating with said chamber, a first port in said chamber covered by a metallic bellows having the end away from said chamber closed, a first threaded cover over said bellows threaded to said body and holding a first spring in compression between the closed end of said bellows and the inside of said first cover, a second port in said chamber covered by a first valve disk, a threaded cover over said first valve disk threaded to said body and holding a second spring in compression between said first valve disk and the inside of said second cover, a first aperture in said first valve disk, a second valve disk covering said first aperture on the side toward said chamber, a rod means extending from the closed end of said bellows to said second valve disk through said chamber such that when pressures less than a predetermined minimum are present in said chamber contraction of said bellows forces said rod means to push said second valve disk against said first valve disk and thereby open said first valve and when pressures greater than a predetermined maximum are present in said chamber expansion of said bellows pulls said rod means and thereby opens said second valve, rotation of said threaded covers serving to change the said predetermined pressures by changing the compression of said springs, and a second aperture to admit and discharge fluids from said cover.

6. A combined pressure-vacuum relief valve comprising a first spring means resiliently holding a first disk valve closed, a second spring means resiliently holding a second valve closed, said second valve seating on the disk of said first valve, a metallic bellows having one end closed and the other end communicating with a source of fluid pressure to be controlled, and means cooperating with said bellows for opening said first valve when the pressure within said bellows is less than a predetermined minimum pressure and for opening said second valve when pressure within said bellows is above a predetermined maximum pressure, said first and second valves having a common inlet and a common outlet.

7. A combined pressure-vacuum relief valve comprising a valve body having a chamber, an inlet port communicating with said chamber, a metallic bellows having one end closed and the other end communicating with said chamber, a first spring means resiliently holding a first disk valve closed, a second spring means resiliently holding a second valve closed, said second valve seating on the disk of said first valve, and linkage means connected to said bellows for opening one of said valves when the pressure within said chamber is less than a predetermined minimum and for opening the other of said valves when the pressure within said chamber is above a predetermined maximum, said first and second valves having a common inlet and a common outlet, and separate threaded cover means for adjusting the compression of said spring means to control said predetermined pressures.

References Cited in the file of this patent

UNITED STATES PATENTS

| 1,480,297 | Parker | Jan. 8, 1924 |
| 1,903,338 | Horne | Apr. 4, 1933 |
| 2,225,964 | Bailey | Dec. 24, 1940 |

FOREIGN PATENTS

| 518,482 | Great Britain | Feb. 28, 1940 |
| 607,089 | Great Britain | Aug. 25, 1948 |